(12) United States Patent
Harrel et al.

(10) Patent No.: US 11,506,292 B2
(45) Date of Patent: Nov. 22, 2022

(54) REPLACEABLE BODY SAVER

(71) Applicant: BlueCore Completions, LLC, Midland, TX (US)

(72) Inventors: Travis Harrel, Midland, TX (US); Christian Leuchtenberg, Singapore (SG); Glen H. Cuiper, Haddon Township, NJ (US)

(73) Assignee: BlueCore Completions, LLC, Midland, TX (US)

( * ) Notice: Subject to any disclaimer, the term of this patent is extended or adjusted under 35 U.S.C. 154(b) by 0 days.

(21) Appl. No.: 17/534,244

(22) Filed: Nov. 23, 2021

(65) Prior Publication Data

US 2022/0154831 A1 May 19, 2022

Related U.S. Application Data

(63) Continuation of application No. 17/016,029, filed on Sep. 9, 2020, now Pat. No. 11,181,200, which is a continuation of application No. 16/008,970, filed on Jun. 14, 2018, now abandoned.

(60) Provisional application No. 62/670,537, filed on May 11, 2018.

(51) Int. Cl.
| | | |
|---|---|---|
| *F16K 5/04* | (2006.01) | |
| *F16K 5/18* | (2006.01) | |
| *F16K 3/24* | (2006.01) | |
| *F16K 3/26* | (2006.01) | |

(52) U.S. Cl.
CPC ............ *F16K 5/0471* (2013.01); *F16K 3/243* (2013.01); *F16K 3/26* (2013.01); *F16K 5/0407* (2013.01); *F16K 5/184* (2013.01)

(58) Field of Classification Search
CPC .......... F16K 5/0471; F16K 3/243; F16K 3/26; F16K 5/0407; F16K 5/184
See application file for complete search history.

(56) References Cited

U.S. PATENT DOCUMENTS

| | | | |
|---|---|---|---|
| 2,813,695 | A | 11/1957 | Stogner |
| 2,911,187 | A | 11/1959 | Owsley |
| 3,061,267 | A | 10/1962 | Hamer |
| 3,133,722 | A | 5/1964 | Mcguire et al. |
| 3,301,523 | A | 1/1967 | Lowrey |
| 3,346,002 | A | 10/1967 | Thompson et al. |
| 3,421,733 | A | 1/1969 | Stewart, Jr. |
| 3,423,067 | A | 1/1969 | Foster |
| 3,497,177 | A | 2/1970 | Hulsey |
| 4,113,228 | A | 9/1978 | Frye |

(Continued)

FOREIGN PATENT DOCUMENTS

| | | |
|---|---|---|
| CN | 202418669 U | 9/2012 |
| CN | 203548966 U | 4/2014 |

(Continued)

*Primary Examiner* — Kevin R Barss

(57) ABSTRACT

A high pressure valve includes a valve body having a surface defining a corresponding portion of a conduit and a pocket. A removable insert is removably inserted into the pocket of the valve body and has surface defining a corresponding portion of the conduit. A seal insert is spaced from the valve body by the removable insert and has an interface with the removable insert. A moving member interfaces with the seal insert for selectively closing the conduit, the interface between the seal insert and the removable insert allows play between the seal insert and the removable insert in response to movement of the moving member.

16 Claims, 10 Drawing Sheets

(56) References Cited

U.S. PATENT DOCUMENTS

| | | |
|---|---|---|
| 4,124,194 A | 11/1978 | Alvarez et al. |
| 5,333,913 A | 8/1994 | Stallard, III |
| 6,279,875 B1 | 8/2001 | Chatufale |
| 6,345,805 B1 | 2/2002 | Chatufale |
| 6,554,249 B2 | 4/2003 | Pang et al. |
| 6,664,572 B2 | 12/2003 | Chatufale |
| 6,966,537 B2 | 11/2005 | Sundararajan |
| 7,004,452 B2 | 2/2006 | Chatufale |
| 7,204,474 B2 | 4/2007 | McGuire et al. |
| 7,481,239 B2 | 1/2009 | McGuire et al. |
| 7,562,859 B2 | 7/2009 | Lam et al. |
| 7,635,113 B2 | 12/2009 | Bearer et al. |
| 7,946,558 B2 | 5/2011 | McGuire et al. |
| 8,297,592 B2 | 10/2012 | McGuire et al. |
| 8,646,752 B2 | 2/2014 | Beasley |
| 8,662,473 B2 | 3/2014 | Comeaux |
| 8,672,295 B2 | 3/2014 | Dhawan et al. |
| 8,689,886 B2 | 4/2014 | Wolfe et al. |
| 8,783,656 B2 | 7/2014 | Allison |
| 9,249,888 B2 | 2/2016 | McEvoy et al. |
| 9,261,196 B2 | 2/2016 | McEvoy et al. |
| 9,987,223 B2 | 6/2018 | Ni |
| 10,100,978 B2 | 10/2018 | Gouge |
| 2003/0015681 A1 | 1/2003 | Chatufale |
| 2011/0259251 A1 | 10/2011 | Little et al. |
| 2012/0080634 A1 | 4/2012 | Fenton |
| 2012/0205569 A1 | 8/2012 | Yeary et al. |
| 2015/0345272 A1 | 12/2015 | Kajaria et al. |
| 2016/0201811 A1 | 7/2016 | Hunter et al. |
| 2016/0356399 A1 | 12/2016 | Shu |
| 2017/0146189 A1 | 5/2017 | Herman et al. |
| 2017/0191570 A1 | 7/2017 | Roberts |
| 2017/0241552 A1 | 8/2017 | Roberts |
| 2017/0276293 A1 | 9/2017 | McKim |
| 2017/0336022 A1 | 11/2017 | Gouge |
| 2017/0343108 A1 | 11/2017 | Hoang |
| 2018/0010697 A1 | 1/2018 | Parks, Jr. |

FOREIGN PATENT DOCUMENTS

| | | |
|---|---|---|
| CN | 203979454 U | 12/2014 |
| CN | 204403416 U | 6/2015 |
| CN | 206280518 U | 6/2017 |
| NO | 20161861 A1 | 5/2018 |
| WO | 2017136841 A1 | 8/2017 |

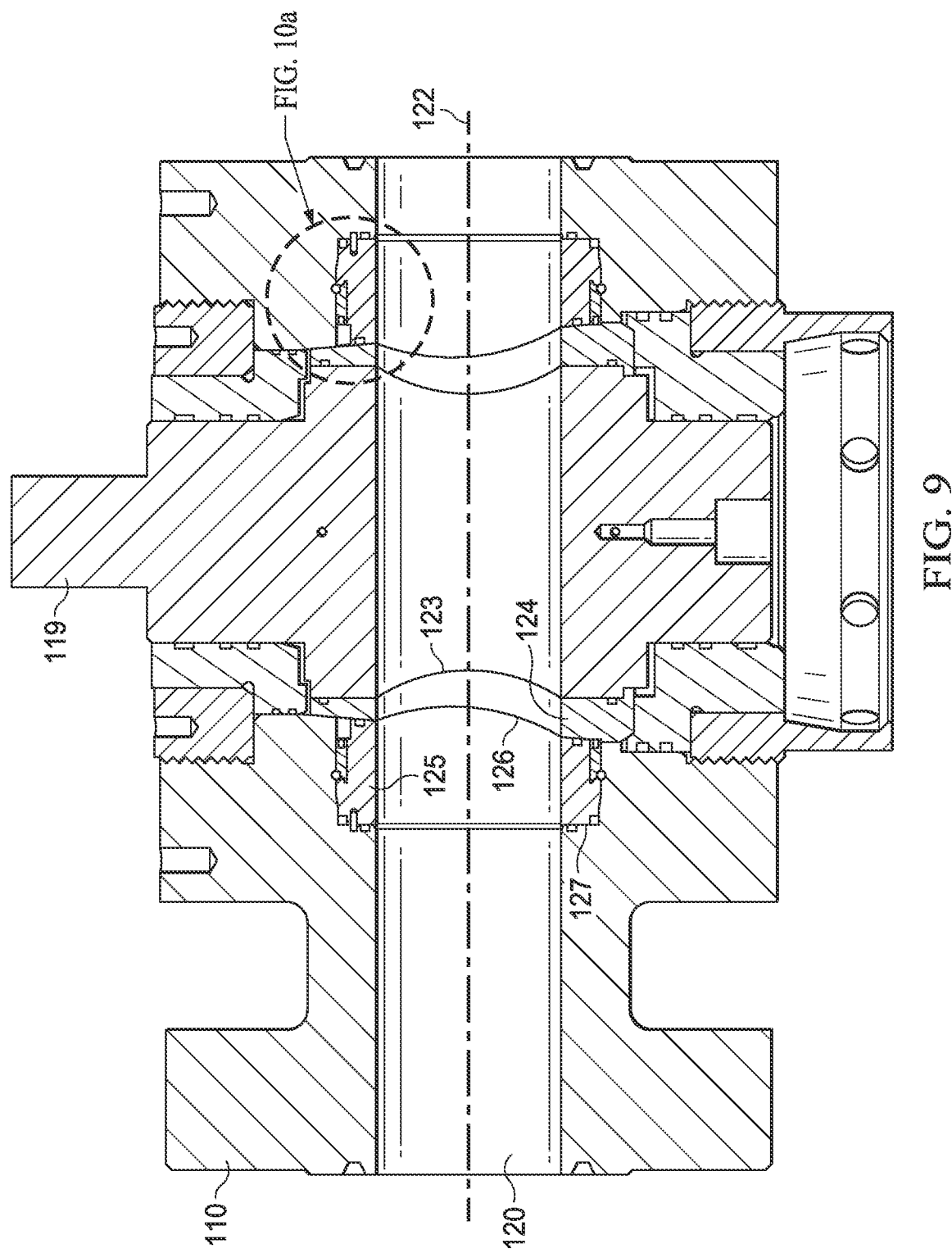

REPLACEABLE BODY SAVER

CROSS-REFERENCE TO RELATED APPLICATIONS

This application is a continuation of U.S. patent application Ser. No. 17/016,029, filed Sep. 9, 2020, entitled REPLACEABLE BODY SAVER, issued as U.S. Pat. No. 11,181,200 on Nov. 23, 2021, which is a continuation of U.S. patent application Ser. No. 16/008,970, filed Jun. 14, 2018, entitled REPLACEABLE BODY SAVER and published as US 2019-0346048 A1. U.S. patent application Ser. No. 16/008,970 claims benefit of U.S. Provisional No. 62/670,537 filed on May 11, 2018. All of the foregoing, including U.S. Pat. No. 11,181,200, the Publication US 2019-0346048 A1, and the applications Ser. Nos. 17/016, 029, 16/008,970 and No. 62/670,537 are each incorporated by reference herein in their entirety.

TECHNICAL FIELD

This invention relates in general to fluid drilling equipment and in particular to high pressure valves subjected to severe operating conditions, such as the high pressures, high flow rates, and abrasive fluids commonly found in hydraulic fracturing operations and other oil and gas drilling applications.

BACKGROUND

Gate and plug valves have a service life that is limited by the condition of the main body. Internal parts can be replaced but eventually the deterioration of the sealing insert to main body interface, due to corrosion, wear, erosion and eventual washout, which leads to an unusable main body. The damaged main body typically needs to be repaired in an intrusive manner such as welding. The root cause of this deterioration is the inherent design of these types of valves, which including small gaps between the internal sealing parts that allow movement of the main sealing interface (e.g., the displacement of the gate between the seats of a gate valve and the rotation of a plug between the inserts in a plug valve). Without these gaps, the gate or plug will lock-up due to friction. The tolerances of these gaps are also affected by the temperature and/or pressure inside the valve.

In one of the most severe service applications known today, hydraulic fracturing ("fracing"), very high pressure slurry is pumped through these valves at very high rates. In fracing, fracing slurry is forced down a wellbore with enough pressure to fracture the hydrocarbon bearing rock formations and force particulates into the resulting cracks. When the pressure is released, the particles ("proppant"), which may be sand or other high compressive strength additives such as ceramic particles and bauxite, remain in the factures (cracks) and keep the fractures open. This "mechanism" then allows pathways for hydrocarbon to flow from the rock that was previously solid. The particle size distribution in these facing fluids is distributed so that the larger particles can prop open larger cracks and finer particles can prop open the very tips of the cracks, which are microscopic in nature. The particle sizes can vary from 0.004 inches to 0.01 inches (No 140 Mesh to No 8 Mesh). The pumping pressure at the valve can be up to 15,000 psi and the slurry velocity through a valve bore of 5.125 inches, as is typical of a 5⅛ inch, 15000 psi valve, is well above erosional velocity of about 50 to 70 feet per second. Moreover, the fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles remain in the valve assembly when the pressure is released. Small particles as large as 0.004 inches are within machining tolerances of steel parts and therefore will find their way into metal sealing surfaces. With the high velocity of abrasive fracing fluid, any weakness or point of turbulence can very quickly lead to a washout of a seal area or any interface. If an area or interface adjoins the valve main body, then the life of the main valve body is severely limited.

To preserve the main moving sealing parts and to allow them to seal effectively, very high viscosity sealing greases are injected and the valves (both gate and plug valves) are greased as many times as practicable on a job. Greasing forces the proppant out of the interfaces to allow effective sealing and prevent scouring of the seal surfaces with trapped particles. Even with this procedure, the moving sealing faces have a very limited service life and are replaced frequently.

For the critical main valve body to seat interfaces, many solutions have been presented for this problem. For gate valves, U.S. Pat. No. 9,261,196, assigned to GE, discloses a seal to exclude sand and U.S. Pat. No. 8,689,886, assigned to Vetco, discloses hardened seat and body faces with metal sand excluders. For plug valves, applications US 2016/0201811, assigned to GE, and U.S. Pat. No. 9,987,223, assigned to Techlock, show attempts at minimizing these gaps with complex seals and in some cases multiple interfaces. The shortcoming of these recent examples, as well as numerous previous attempts, is their failure to address the fundamental root cause of body failure, namely, for the very existence of an interface between the main valve body and a sealing insert.

Another method that has been used to extend the life of the valve is lining the inner bore of the valve with tougher metal than that of the valve body itself. Such solutions for gate valves are presented in U.S. Pat. No. 7,481,239, assigned to Stinger, and more recently in US application 2017/0191570, assigned to Valveworks. With the increasing frac flow rate velocities the typical low alloy valve steel, such as 4130, required tougher steel liners, such as 4340 alloy steel, and precipitation hardening martensitic steels, such as steels in the 17-4PH range. These solutions have many additional parts and nonetheless still have gaps in their assemblies, which leads not to direct failure of the valve body, but instead of the liners. Plug valves have been lined similarly as disclosed in U.S. Pat. No. 7,204,474, assigned to Stinger, with the linings attempting to prevent the whole bore of the valve from eroding.

Today, with the higher pressures and higher frac flow-rates, larger valves are being constructed directly from the higher strength steels like 4340 and 17-4PH steel. These hold up well, although lining the bore does not provide any additional benefit. These steels are difficult and time intensive to weld repair, and therefore a cost effective and simple method is required to preserve the main deterioration point of these valves, namely, the seal insert to body area. Preserving the seal insert to body area will thereby extend the service life of the higher cost high strength and low corrosion steel bodies.

SUMMARY

One representative embodiment of the present inventive principles is a high pressure valve, which includes a valve body having a surface defining a corresponding portion of a conduit and a pocket. A removable insert is removably inserted into the pocket of the valve body and has surface defining a corresponding portion of the conduit. A seal insert is spaced from the valve body by the removable insert and has an interface with the removable insert. A moving member interfaces with the seal insert for selectively closing the conduit, the interface between the seal insert and the removable insert allows play between the seal insert and the removable insert in response to movement of the moving member.

Advantageously, erosion, corrosion or other damage is isolated to the removable annular insert, rather than the valve body. When the removable insert has sustained an unacceptable degree of damage, it can be removed and replaced or re-machined. In addition, the principles of the present invention also allow for removal and replacement of removable insert without resort to intrusive techniques, such as welding.

BRIEF DESCRIPTION OF THE DRAWINGS

For a more complete understanding, reference is now made to the following description taken in conjunction with the accompanying Drawings in which:

FIG. 1b is schematic side cross-sectional view showing in further detail of gate valve seat to body sealing of the gate valve shown in FIG. 1a;

FIG. 4b is a schematic cross-sectional side view showing in further detail the double insert seat art of the plug valve of FIG. 4a;

FIG. 5b shows further details of the valve body to seal interface of the valve of FIG. 5a;

FIG. 9 is a schematic cross-sectional side of plug valve with tapered insert according to a representative embodiment of present invention;

DETAILED DESCRIPTION

The problems being solved and the solutions provided by the embodiments of the principles of the present invention are best understood by referring to FIGS. 1 to 11 of the drawings, in which like numbers designate like parts.

Figure 1A:
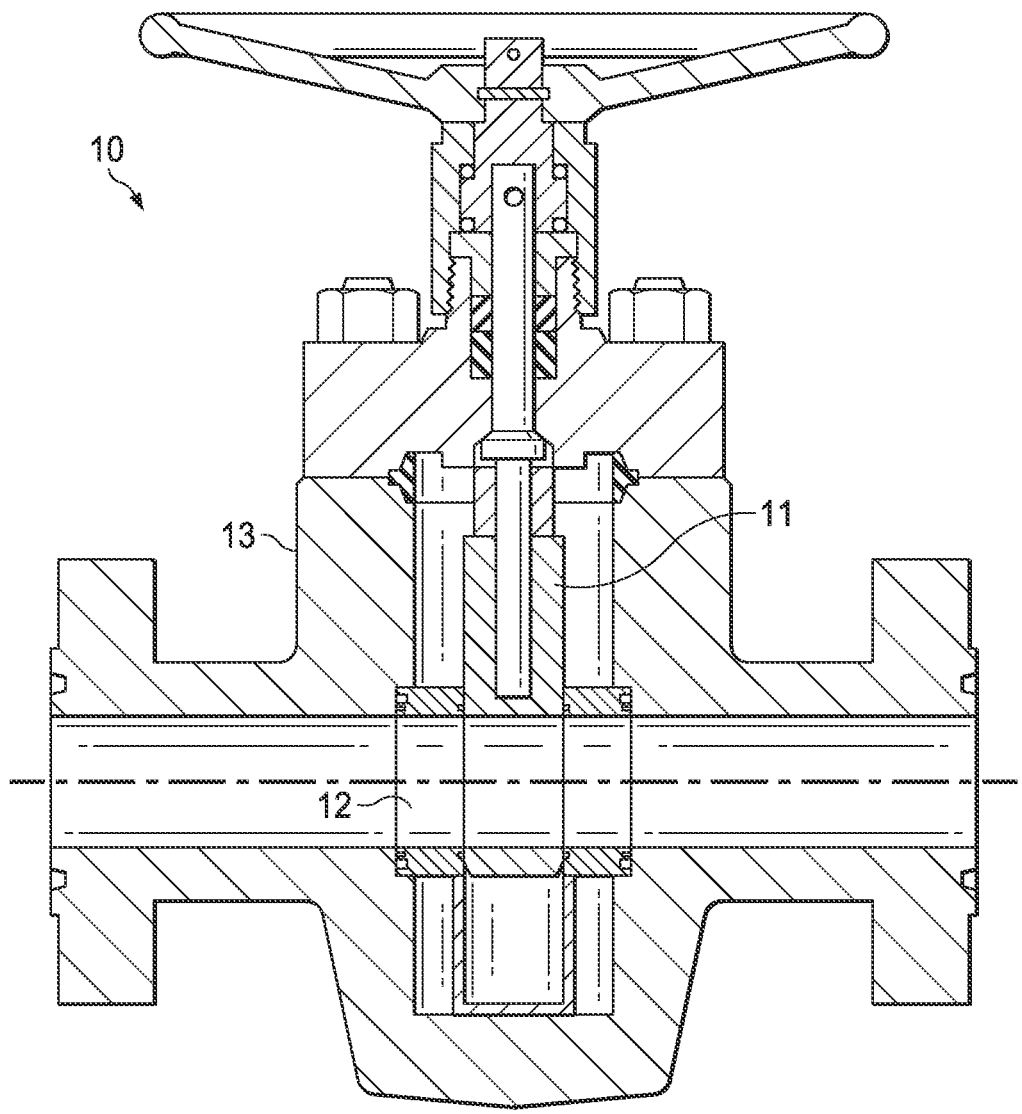
FIG. 1a is a schematic side cross-sectional view of a prior art gate valve.

FIG. 1a shows a prior art gate valve 10 of a design used for severe service high pressure fracing applications. Gate valve 10 has a gate 11 that can move in a sliding movement against a seal insert 12 and perpendicularly to the bore of a valve body 13.

Figure 1B:
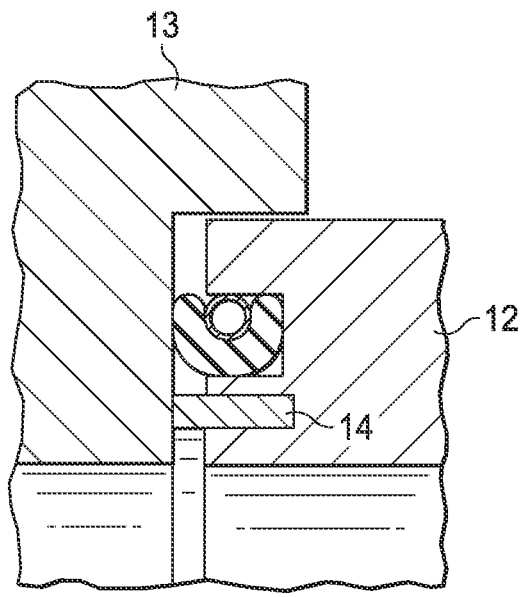

FIG. 1b is a schematic side view drawing showing in detail the seal insert 12 to valve body 13 bore sealing interface. Note that this interface has a gap, as all gate valves do, to allow tolerance for moving the gate. This gap is the root cause of the failure of gate valves as will be explained in detail below. In fracing applications, frac sand will penetrate this gap, even with the sand excluder 14 in this design, and eventually the seal areas in the gap corrode, erode and ultimately wash out.

Figure 2:
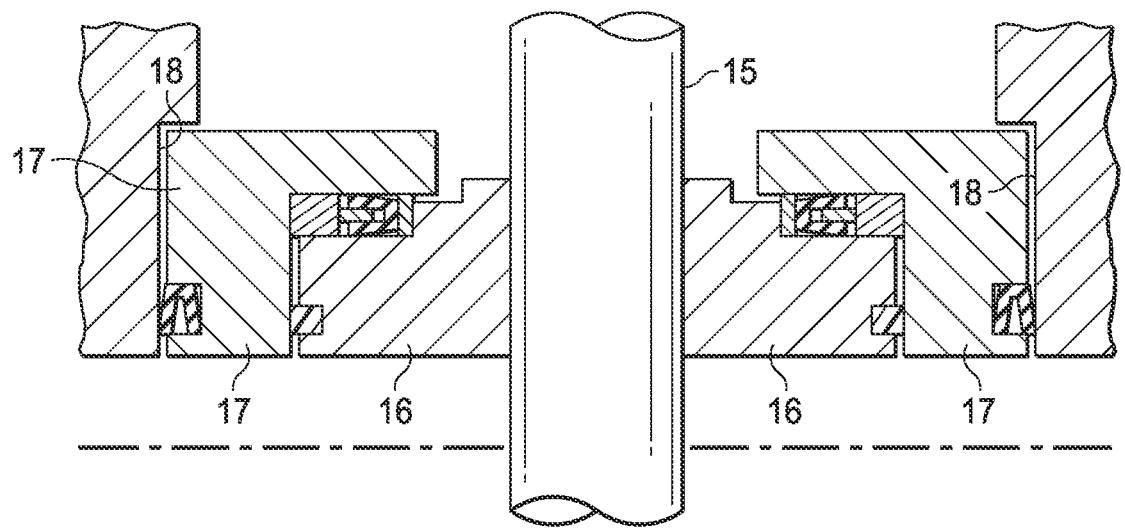
FIG. 2 is a schematic side view of another prior art gate valve with a double seat gate to body sealing.

FIG. 2 is a schematic block cross-sectional side view of a prior art gate valve with a double seat solution. This gate valve has a gate 15 and an inner seat 16 engaged with an outer seat 17. This outer seat 17 is inserted with a seal into the body 18. The example of FIG. 2 illustrates that some gate valve designs have two parts making up the stationary seal assembly, with both pieces gapped and seals covering the gaps. This type of design also fails rapidly in fracing applications due to the penetrative properties of the fracing slurry.

Figure 3:
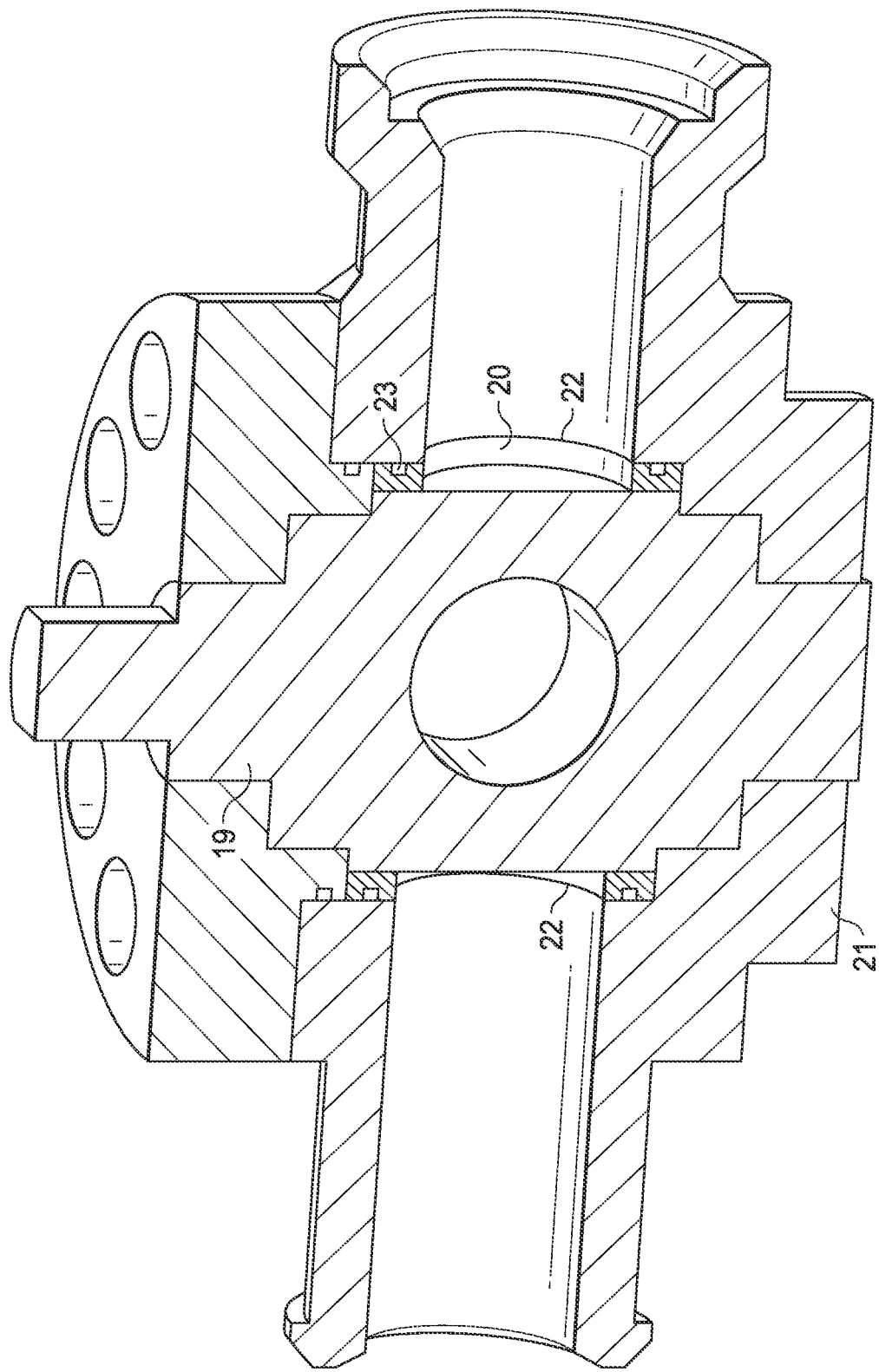
FIG. 3 is a schematic cross-sectional side view of a prior art plug valve.

FIG. 3 is a schematic cross-sectional side view of a prior art plug valve having plug 19 sealing in a rotating fashion against stationary inserts 20. These inserts 20 are sealed against the body 21 and have a tolerance gap at 22 to allow the plug 19 to move. Typical failure of the body is in the region of the seal 23 with frac sand penetrating the gap 22, opening it to corrosion and erosion and eventual failure, which is a very rapid process under fracing conditions with acid washes.

Figure 4A:
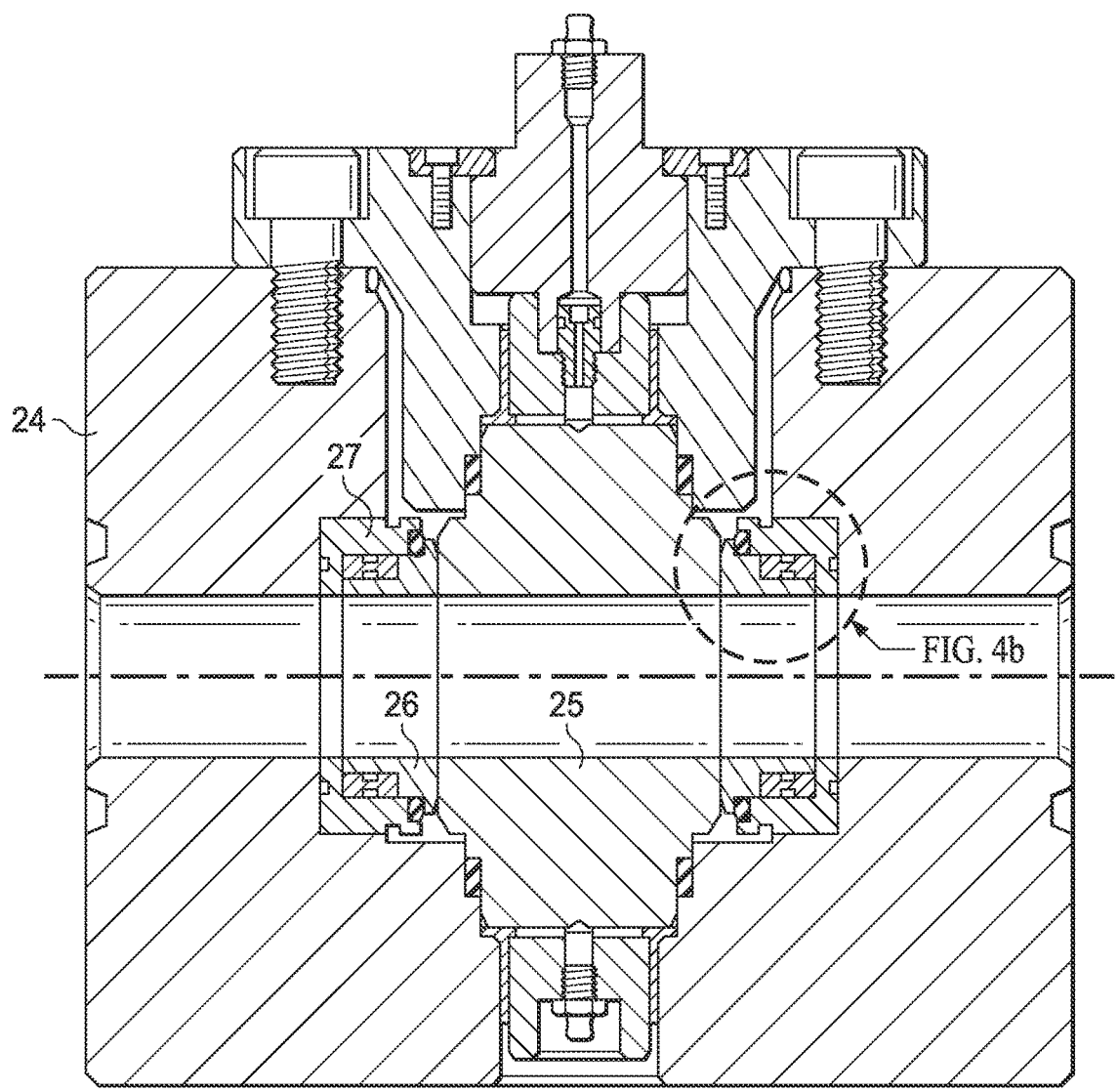
FIG. 4a is a schematic cross-sectional side view of a prior art plug valve with a double seat design.
Figure 4B:
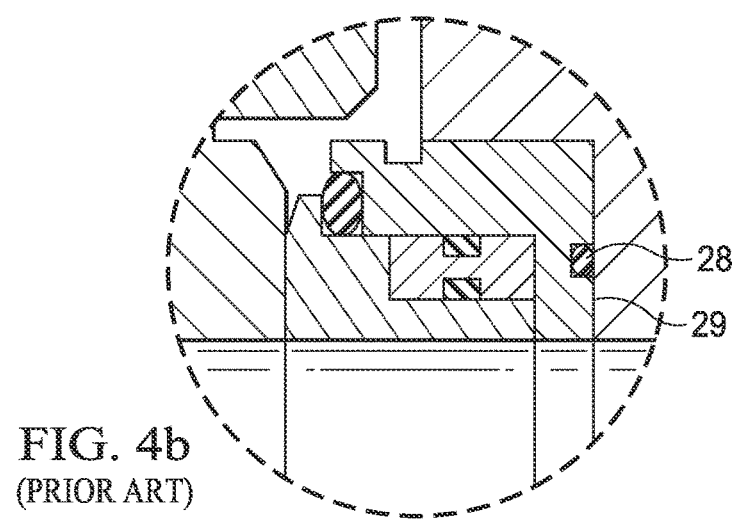

FIGS. 4a and 4b are respectively schematic cross-sectional and detailed views of a double insert seat of a prior art plug valve. FIG. 4a shows valve body 24 having a plug 25 that can seal in a rotating fashion against an insert assembly consisting of two pieces 26 and 27. In FIG. 4b, the detail of the seal assembly is shown to illustrate that some plug valve designs have two parts making up the stationary insert assembly. In these designs, both pieces are gapped with seals covering the gaps. This type of design also fails rapidly in fracing applications, with the typical failures being in the area of the seal 28 of FIG. 4b due to the gap at interface 29.

Figure 5A:
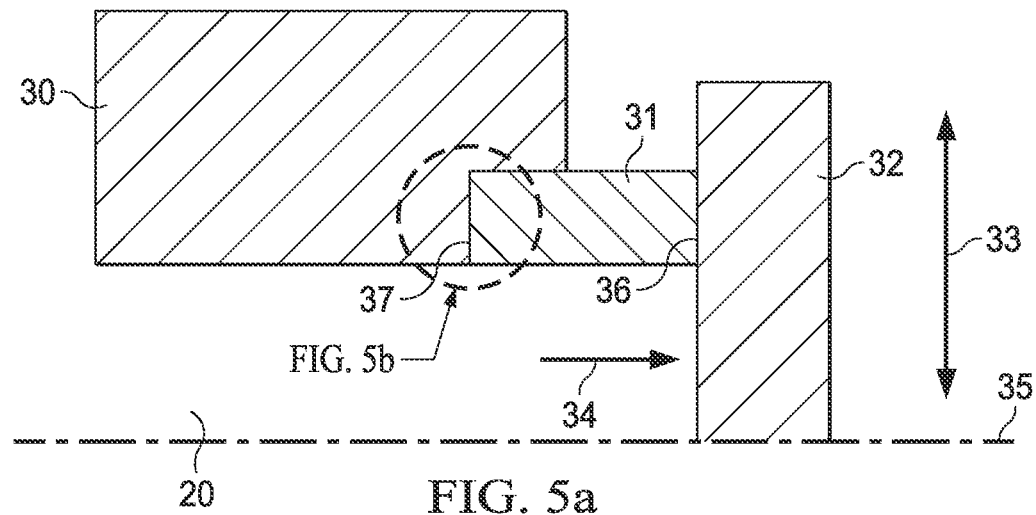
FIG. 5a is a schematic block cross-sectional side view of an exemplary gate valve to explain the problem being addressed by the embodiments of the present invention.

FIG. 5a illustrates the root cause of washout in valves used in severe environments, such as those found during fracing operations. In particular, FIG. 5a is a schematic block diagram of a cross-section of a portion of a typical gate valve configuration with a body 30, seal insert 31 and gate 32, which moves in a perpendicularly back and forth in the direction indicted by arrow 33. The valve bore 20 is associated with an arrow 34 showing the direction of pressure force, assuming the valve is closed. A center line 35 of the valve bore is shown for reference.

Figure 5B:
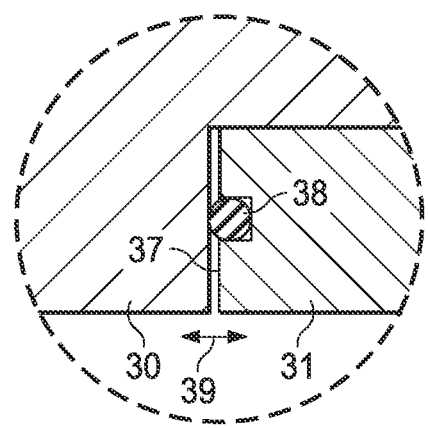
Figure 5C:
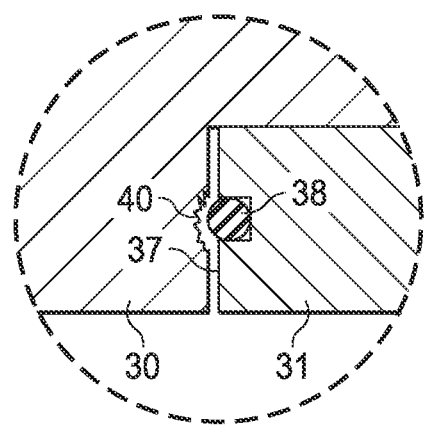
FIG. 5c shows further details of the valve body to seal interface of the valve of FIG. 5a with erosion.

One of the main moving seal interfaces is shown at 36 between the stationary seal insert 31 and the gate 32. When the valve is closed, the gate 32 is pushed to the right to seal on a seal similar to seal insert 31, but on the opposing side of gate 32 (not shown). Due to the necessary tolerance gaps to allow movement of the gate 32, when the whole assembly is forced to the right under high pressure, the sum of all these tolerances opens a small gap at interface 37, resulting in a gap 37, as shown in FIG. 5b. Typically, some sort of seal is in the gap 37, which is exemplified by an O-ring 38, though the actual seals may differ from design to design as illustrated by the prior art.

When pressure is applied in the opposite direction of arrow 34, then gap 37 closes and a corresponding gap opens on the opposite side of the gate and seat assembly (not shown). The back and forth movement 39 wears out the metal in the gap 37, as shown in FIG. 5b in the form of a cavity 40. Once this mechanism, which is aided by erosion and corrosion, creates a large enough cavity 40, the seal area fails and rapid washout of the body part as well as insert occurs. The presence of frac sand, which is designed to penetrate into the smallest cracks, aids this process significantly, given that frac sand is a hard material.

This mechanism is repeated in a mirror fashion on the other side of the gate on the other seat and seat pocket. As one skilled in the art can appreciate, a valve operating under fracing conditions must seal bi-directionally while being actuated multiple times during a fracing operation, which results in very rapid failure at the seal-body interface and damage to main body. The insert 31 can of course be replaced, but the rapid deterioration of the body 30 at the interface 37 leads to severely shortened service life of the main body of the valve, requiring replacement or intrusive repair like welding and machining.

Referring back to FIGS. 1a, 1b and 2, all gate valve designs require a gap similar to gap 37 of FIGS. 5a-5b for providing sufficient tolerance to allow the gate to move. Hence, all current gate valve designs are subject to the same failures described immediately above. Furthermore, an ionic fluid, such as hydrochloric acid, is commonly used before or after fracing operations, in addition to other additives in the fracturing fluid. The ionic fluid and fracturing fluid additives can accelerate galvanic corrosion in the gap, given that stationary sealing inserts are often made of different steel grades or other material combinations having different positions on the galvanic table. These differences in steel grade, while small, are significant in the presence of the 15% hydrochloric acid concentrations often used in fracing operations.

Figure 6:
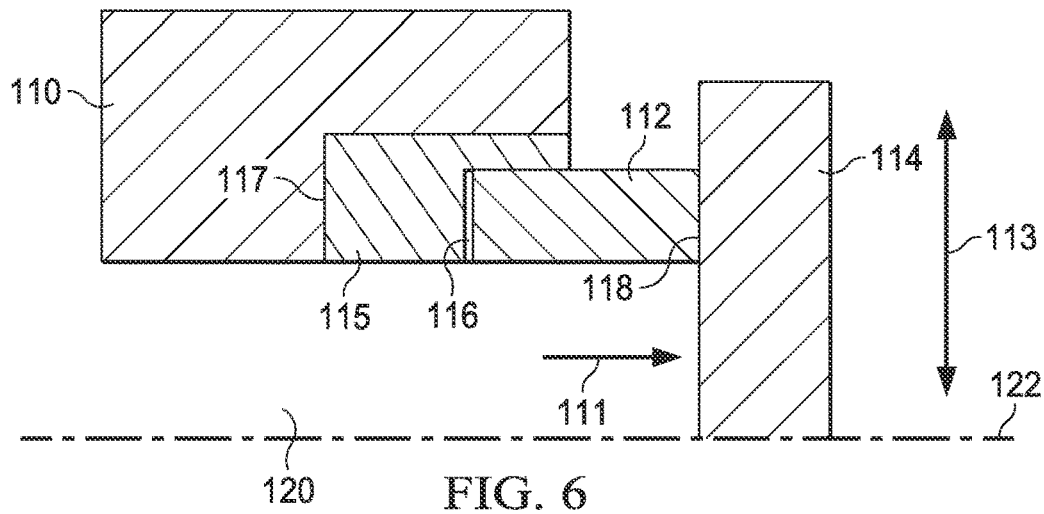
FIG. 6 is a schematic block cross-section side view of a representative gate valve according to one embodiment of the present invention.

FIG. 6 is a schematic block cross-sectional view of a portion of an exemplary gate valve embodiment according to the principles of the present invention. According to the principles of the present invention, an annular body saver 115 is disposed between the annular portion of valve body 110 and the stationary sealing insert 112. In order for the gate valve to work as designed, a gap 116 must still exist between the body saver 115 and the stationary seal insert 112. The exemplary valve also includes gate 114, which moves in accordance with arrow 113, seal insert to gate interface 118, and cylindrical bore 120 having a bore centerline 122.

The body saver 115 according to the present principles advantageously functions as a replaceable part that preferentially sees wear so that the integrity, and therefore the service life, of the valve body 110 is not affected. In particular, the annular body saver 115 is rigidly fixed to within an annular pocket within the annular portion of valve body 110 so that there is substantially no gap at interface 117 nor any movement tolerance that would open a gap at interface 117. This configuration ensures that the body saver 115 to body 110 interface 117 does not deteriorate by the mechanisms described earlier as the root cause, the existence of a gap is removed by this design.

When the expected interface wear at gap 116 is a sufficient to risk failure, the body saver 115 is removed and replaced together with a new seal insert 112. Preferably, the body saver 115 is not a bore saver, but instead saves the highest wearing location in a gate valve, namely, the seat pocket. According to the present principles, the body saver 115 has one or more of the following features: a) be made from the same material as the body 110 to avoid any galvanic corrosion issues; b) have a sealing system, which can consist of seals in the body saver 115 and/or the body 110; c) be rigidly affixed to the body so that there is no mechanical gap at interface 117—for example, this fixation can be screwed, threaded, interference fit or based on another type of retaining mechanism such as a retaining or snap ring; d) have a positive sand exclusion seal preferentially placed as close to the body 110 bore side of interface 117; e) be removable and replaceable without machining, cutting, welding or other method interfering directly with the integrity of the main body 110; and f) have no protrusions into the main bore or tapers or other features that could cause turbulence and rapid erosion under fracing conditions.

Eventually, under the harsh conditions of fracing, even the interface 117 could deteriorate. In this case, the body saver 115 is removed, the annular pocket within the valve body 110 around interface 117 is machined further axially into the bore. Then a new slightly longer body saver is installed and the valve can continue service with the same seal insert 112 type. All this is advantageously achieved without a costly weld repair.

Figure 7:
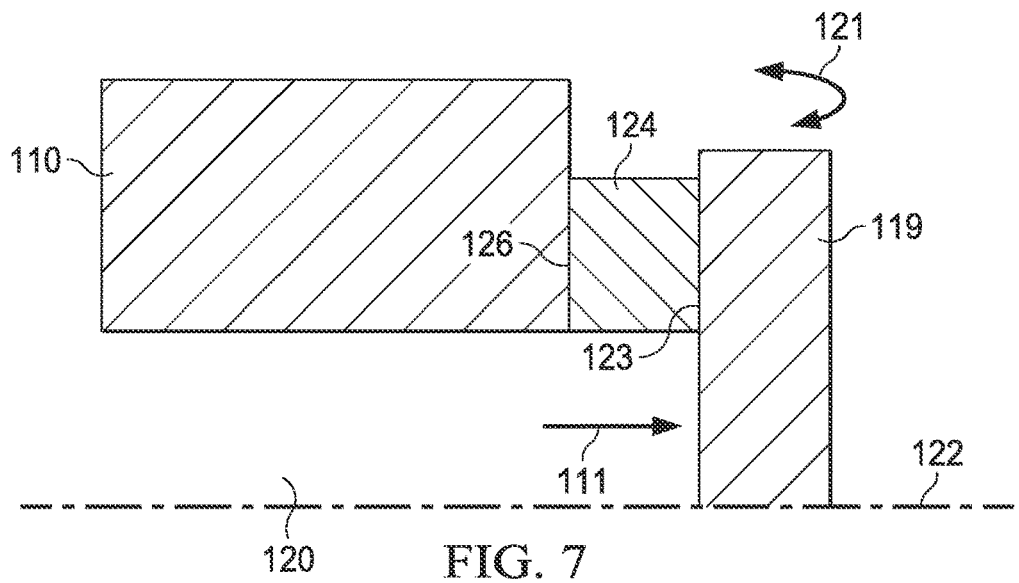
FIG. 7 is a schematic block cross-sectional side view of a plug valve illustrating the problem being addressed by the principles of the present invention.

The principles of the present invention also advantageously apply to plug valves. FIG. 7 is a schematic block cross-sectional view of a representative plug valve. Common parts like body 110, bore 120, center line 122, and pressure direction 111 are the same as the exemplary gate valve embodiment of FIG. 6.

A cylindrical plug 119 rotates clockwise and anticlockwise by ninety degrees, as shown by arrow 121. A stationary insert 124 is installed between the plug 119 and the body 110 and is typically tapered (not shown) and forced into the bore 120 to minimize the gaps at interface 123 between the plug 119 and the stationary insert 124. At the extreme pressures needed for fracing, plug valves have a metal to metal seal at interface 123, typically aided by very high viscosity greasing sealant. The interface between the stationary insert 126 and the body 110 usually has some sort of soft seal and a gap to give the necessary tolerance required to allow rotational movement of the plug 119 with respect to the insert, without locking up due to excessive friction.

For a plug valve, the deterioration of the body 110 occurs at interface 126. Generally, the deterioration mechanism is similar to that of a gate valve, since the required tolerances for rotation require some lateral movement at interface 126 as the pressure of arrow 111 is reversed. This back and forth motion allows the very small frac sand particles to enter the interface area 126 leading to erosion, corrosion and eventual failure of the seal at that interface.

Figure 8:
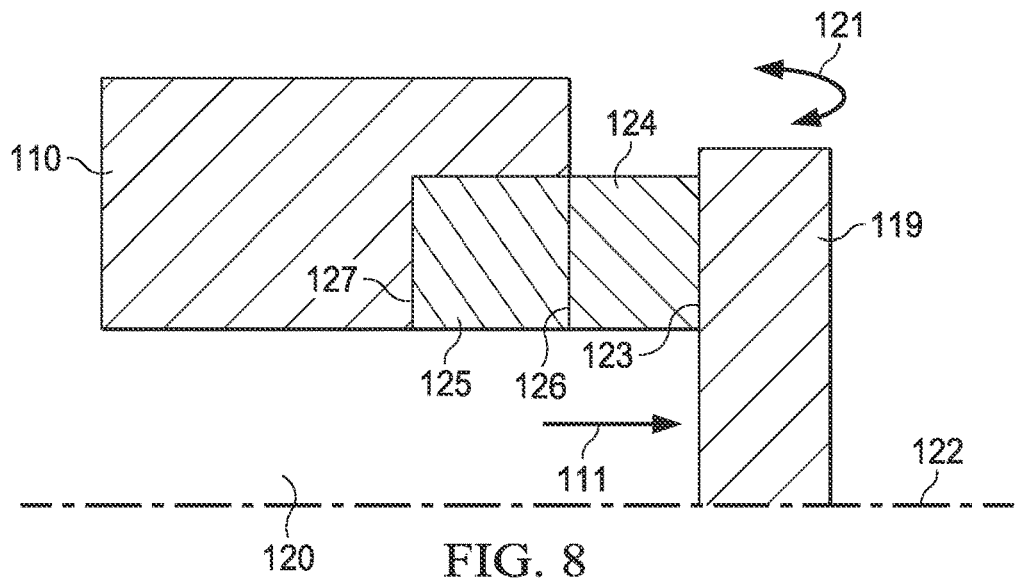
FIG. 8 is a schematic block cross-sectional view of a plug valve illustrating the solution given by the principles of the present invention.

FIG. 8 is a schematic block cross section view of a portion of a representative plug valve embodying the principles of the present invention. An annular body saver 125 is installed in an annular pocket with a new interface 127 with the annular portion of valve body 110. A gap is formed at an interface 126 of the seal insert 124 with the body saver 125 to allow plug 119 to move. The body saver 125 is rigidly fixed to the body 110 with no gap at interface 117. In this embodiment, wear will occur on the body saver 125, at interface 126 thus preserving the valve body 110 at interface 127.

Preferably, the body saver 125 will have features similar to features a) to f) discussed earlier with regards to the gate valve embodiment. It is also possible here, if there is a long-term deterioration of interface 127, to machine deeper axially into the end wall of the pocket within valve body 110 and installing a correspondingly longer body saver 125.

FIG. 9 depicts a cross section of plug valve with tapered inserts according to the principles of the present invention. For discussion purposes, this plug valve design is a 5⅛ inch bore, 15,000 psi working pressure valve. Some common structures from FIG. 8, including valve body 110, cylindrical bore 120, centerline 122, plug 119, interface 123 between plug and tapered seal insert 124, and interface 126 between seal insert 124 and body saver 125 have also been assumed for discussion purposes. The interface 127 between the body saver 125 and the valve body 110 is indicated.

Figure 10A:
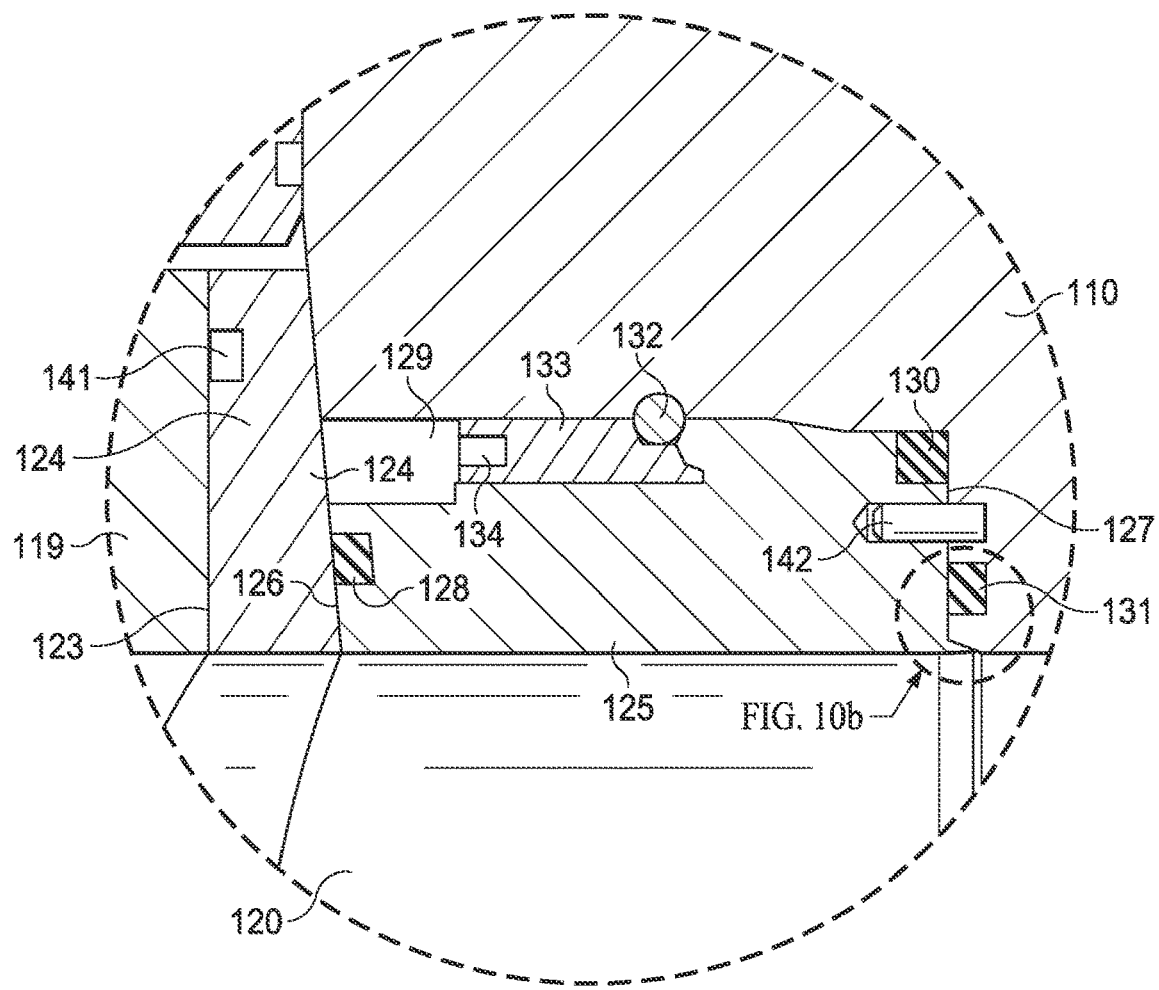
FIGS. 10a and 10b show further details of portions of the plug valve of FIG. 9.

In FIG. 10a, cylindrical plug 119 rotates with respect to stationary tapered annular seal insert 124 at interface 123, 129 is an empty gap, 128 is the main seal between the annular tapered seal insert 124 and the body saver insert 125. An annular space 141 is disposed within the stationary insert 124 between plug 119 and stationary insert 124, this is a sealant grease groove that acts as an assistance seal to the metal sealing interface 123. The annular body saver 125 is sealed to the main body 110 at distinct sealing points: seal 130, which could be an elastomeric seal that is situated in the body saver 125; seal 131, which could be an elastomeric seal that is situated in the body 110; and seal 135, which is a metal to metal interference seal, shown in detail in FIG. 10b. The seal 128 in the body saver 125 is in the exact same position and spatial orientation as it would be present in the valve body 110, were there no body saver installed, the space being solid metal that is an integral part of the valve body. Guide pin 142 serves to correctly orientate the body saver insert 125, which has a tapered cylindrical profile at interface 126 concurrent with the tapered seal insert 124. The other items making up the assembly are a round snap ring 132 and a retainer 133. The body saver 125 is installed in the body without the plug 119 and tapered insert 124 being present. The body saver insert 125 is inserted with the guide pin orienting it into the body 110.

Figure 10B:
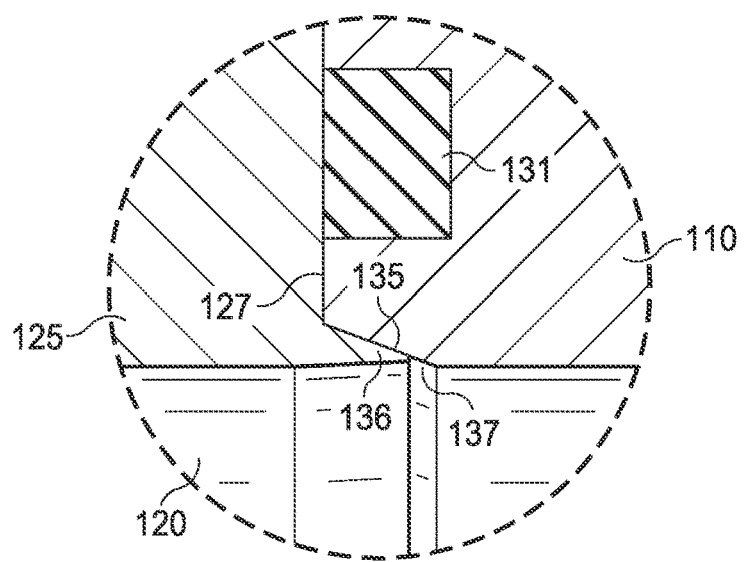

Referring to FIG. 10b, the integral metal lip 136 of the body saver 125 has an interference fit with the valve body 110 at interface 135. The body saver 125 is installed with a compression tool so that the seals 130 and 131 completely fill their grooves and there is no gap at interface 127. The metal lip 136 engages slightly before full closure of the gap at interface 127, and when gap is closed, it has a preloaded metal to metal contact with the valve body 110 along the circumference of the cylindrical bore 120 along interface 135, thus excluding any sand penetration. With the body saver 125 held in place, a circular cross section retaining ring 132 is installed the location shown. Then the retainer 133 is inserted with an interference fit to keep the retaining ring 132 in place. The retainer 133 has a gap feature 134 that ensures a further metal to metal seal this point (not shown). Then the installation compression tool can be removed and a seal 128 installed. The body saver 125 is now a rigid part of the body 110, with no gap at 127. All the wear will take place at interface 126 between the insert 124 and the body saver 125 in the vicinity of the seal 128 which is the main corrosion and erosion point of this design. Once the erosion in vicinity of seal 128 becomes significant enough to affect the sealing performance or risk a washout, this being determined by visual inspection during maintenance, the body saver 125 can be un-installed and a new one installed. This allows significant extension of the main body 110 life.

This design has all the features listed earlier: a) the body saver 125 is of the same steel as the valve body 110; b) there two elastomeric seals, seal 130 in the body saver 125 and seal 131 in the body 110; c) the body saver 125 is rigidly affixed to the body 110 by a retainer ring 132 secured with a retainer 133 so that there is no mechanical gap at interface 127; d) a positive metal sand exclusion seal 136 is disposed close to the body bore 120 side of interface 137; e) the body saver 125 can be simply removed by reversing the installation procedure; and f) there are no protrusions into the main bore 120 or tapers or other features that could cause turbulence and rapid erosion under fracing conditions, as shown in FIG. 10b. The small depression at interface 137, at the point of intersection between body saver 125 and body 110, is engineered to be the same as the meeting of two 5⅛" 15,000 psi API flange faces with a BX seal ring installed, which has been found not to cause sufficient turbulence for erosion.

Figure 11A:
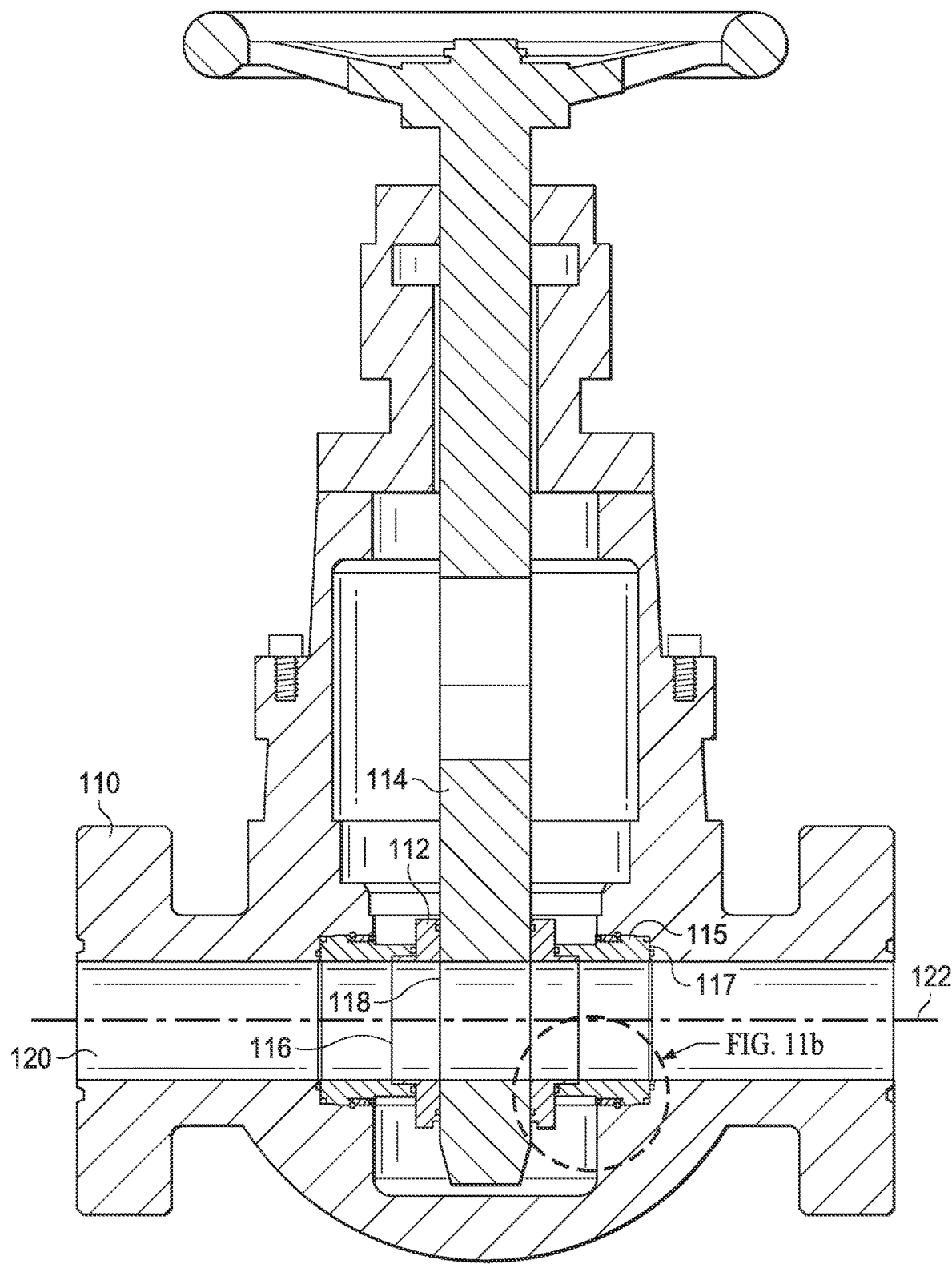
FIG. 11a is a schematic cross-sectional side view of a gate valve according to an embodiment of present invention.
Figure 11B:
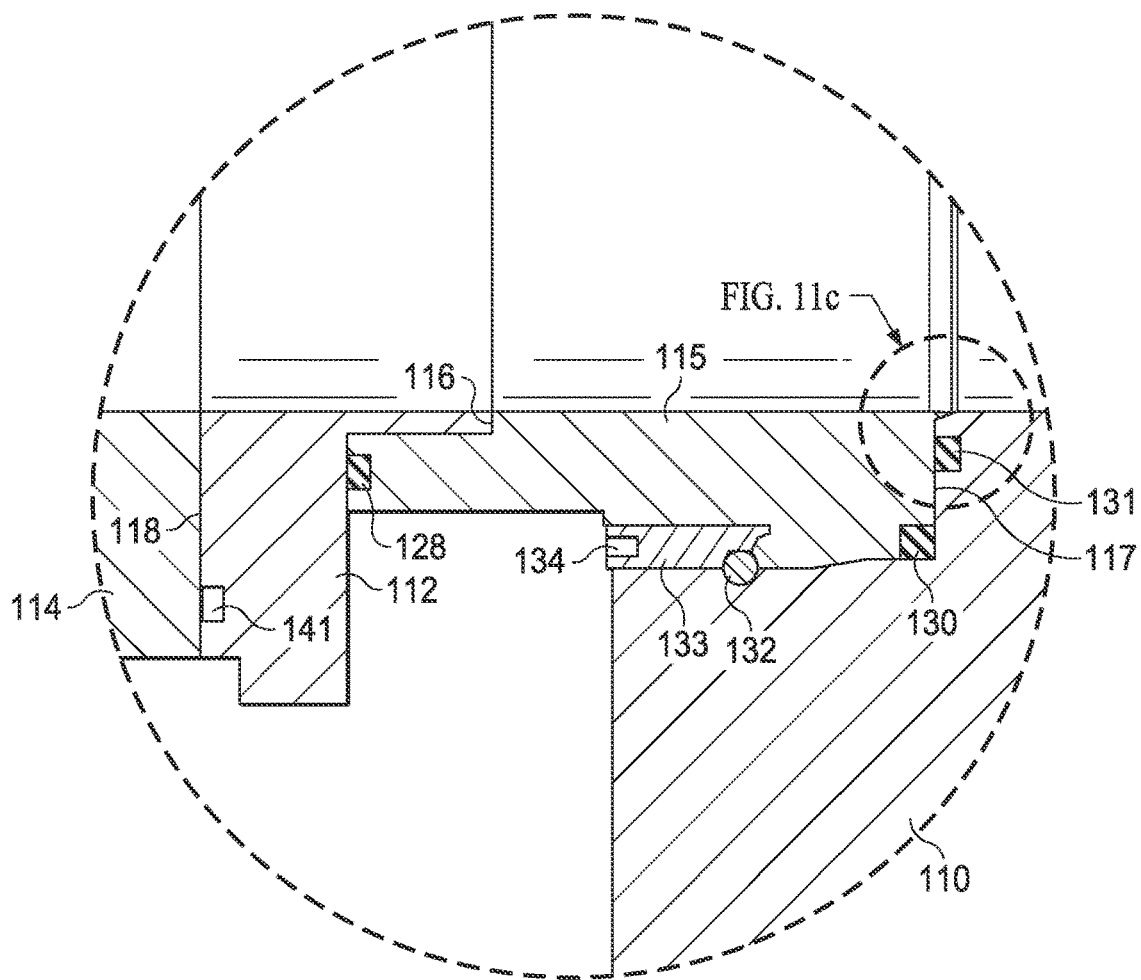
FIGS. 11b and 11c show further details of portions of the gate valve of FIG. 11a in further detail.
Figure 11C:
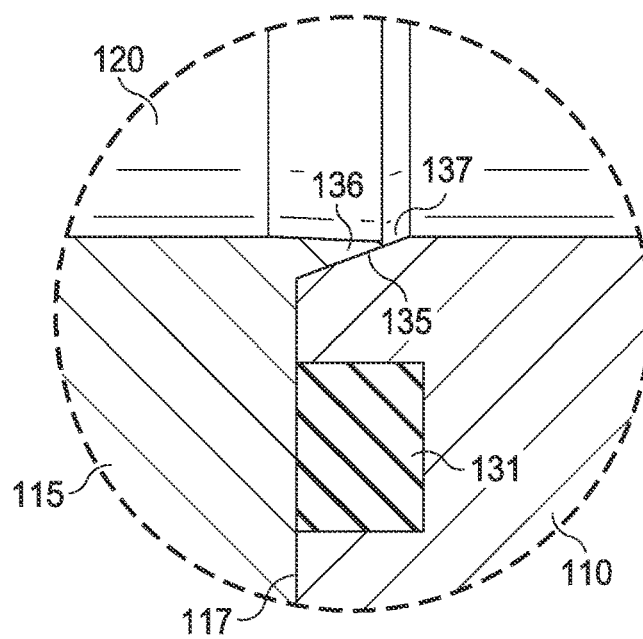

FIG. 11a is a cross section of gate valve showing an embodiment of present invention, with further details provided in FIGS. 11b and 11c. Some common structures of FIG. 6 have been assumed for discussion purposes, including body 110, cylindrical bore 120, centerline 122, gate 114, interface 118 between moving gate 114 and stationary gate sealing insert 112. The body saver 115 has a different sealing profile at interface 116 compared to that of body saver 125 of FIGS. 9 and 10. However the parts inserted into the body 110 are substantially the same. The body saver 115 seals to the main body 110 at interface 117.

The body saver 115 is sealed to the main body 110 at interface 117 with distinct sealing points: seal 130, which could be an elastomeric seal that is situated in the body saver 114; seal 131, which could be an elastomeric seal which is situated in the body 110; and seal 136 which is a metal to metal interference seal shown in further detail in FIG. 11c. (A guide pin would typically be at the upper part of the bore 120 and FIG. 11b only shows the lower part of the bore 120). The function and installation of the body saver insert 115 is the same as discussed for body saver 125 of FIG. 10 and the interface 127 on a plug valve is equivalent to the interface 117 on a gate valve.

As can be seen from the description given and the detail in FIG. 11b, it is possible to design the main failure point of the gate valve body 110 at interface 116 away from the body 110 by the installation of the body saver 115 which then contains the deteriorating interface 116. In the design shown in FIG. 11b, the sealing insert 112 has a grease groove 141 and a main seal 128, but this could be any particular gate valve seat design which may differ in detail.

Similar solutions as described in FIGS. 10 and 11 can be applied to differing gate and plug valve designs, as well as for fluid conduits that experience body failure due to the mechanism described above in conjunction with FIG. 5. Thus one skilled in the art could design body savers with differences in retaining and/or sealing solutions that retain the key common features of this invention which are: 1) rigid fixation of the body saver to the fluid conduit body; 2) no gap between the body saver and valve body at the axial interface within the bore; 3) no protrusions into the fluid conduit bore or tapers or other disturbing features; and 4) be removable and replaceable without machining, cutting, welding or other method interfering directly with the integrity of the fluid conduit body. In addition, the principles of the present invention may also be applied to such applications as production tree valves and flow-back operations.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A high pressure valve comprising:
   a valve body having a sidewall defining a first portion of a cylindrical bore extending therethrough along a centerline and further defining a plug bore extending therethrough perpendicular to the centerline;
   a tapered seal insert disposed within the plug bore, the tapered seal insert having an annular configuration defining an interior cavity;
   a plug having a central portion rotatably disposed within the interior cavity of the tapered seal insert, the plug further configured with an upper shoulder and a lower shoulder on opposite ends of the central portion, an upper stem extending upward from the upper shoulder, and a lower stem extending downward from the lower shoulder;
   a first cap annularly disposed around the upper stem between the plug and the valve body, the first cap having a first interior surface abutting an exterior surface of the upper stem, a first exterior surface abutting an interior surface of the plug bore, and an upward facing exterior shoulder;
   a first retaining nut installed in an upper portion of the plug bore and having a lower surface configured to bear against the upward facing exterior shoulder of the first cap to retain the first cap in the plug bore;
   wherein the first cap is prevented from rotating relative to the valve body when the first retaining nut is installed;
   a second cap annularly disposed around the lower stem of the plug between the plug and the valve body, the second cap having a second interior surface abutting an exterior surface of the lower stem, a second exterior surface abutting the interior surface of the plug bore, and a downward facing exterior shoulder;
   a second retaining nut installed in a lower portion of the plug bore and having an upper surface configured to bear against the downward facing exterior shoulder of the second cap to retain the second cap in the plug bore;
   wherein, the second cap is prevented from rotating relative to the valve body when the second retaining nut is installed; and
   wherein, when the plug is rotated relative to the valve body, the respective exterior surfaces of the respective stems move relative to the abutting respective interior surfaces of the respective caps, but the respective exterior surfaces of the respective caps remain stationary relative to the abutting interior surfaces of the plug bore of the valve body.

2. The high pressure valve of claim 1, further comprising:
   at least one upper stem seal disposed between the first interior surface of the first cap and the exterior surface of the upper stem;
   at least one upper cap seal disposed between the first exterior surface of the first cap and the interior surface of the plug bore;
   at least one lower stem seal disposed between the second interior surface of the second cap and the exterior surface of the lower stem; and
   at least one lower cap seal disposed between the second exterior surface of the second cap and the interior surface of the plug bore.

3. The high pressure valve of claim 2, further comprising:
   at least one upper centering ring disposed between the first interior surface of the first cap and the exterior surface of the upper stem; and
   at least one lower centering ring disposed between the second interior surface of the second cap and the exterior surface of the lower stem.

4. The high pressure valve of claim 2, wherein:
   the first retaining nut further includes first exterior threads;
   the upper portion of the plug bore includes first interior threads; and
   the first retaining nut is removably installed in the upper portion of the plug bore by engagement of the first exterior threads with the first interior threads.

5. The high pressure valve of claim 4, wherein rotation of the first retaining nut moves the lower surface of the first retaining nut against the upward facing exterior shoulder of the first cap.

6. The high pressure valve of claim 4, wherein:
   the second retaining nut further includes second exterior threads;
   the lower portion of the plug bore includes second interior threads; and
   the second retaining nut is removably installed in the lower portion of the plug bore by engagement of the second exterior threads with the second interior threads.

7. The high pressure valve of claim 6, wherein rotation of the second retaining nut moves the upper surface of the second retaining nut against the downward facing exterior shoulder of the second cap.

8. The high pressure valve of claim 7, wherein the second cap further includes an upward facing cap surface opposite the downward facing exterior shoulder, and the upward facing cap surface abuts a lower facing surface of the tapered seal insert.

9. The high pressure valve of claim 8, wherein rotation of the second cap moves the second cap and the tapered seal insert upward in the plug bore of the valve body.

10. The high pressure valve of claim 9, further comprising an interior lip formed on the lower interior surface of the tapered insert, the interior lip configured to engage a secondary shoulder formed on the central portion of the plug; and wherein moving the tapered seal insert upward in the plug bore of the valve body also moves the plug upward in the valve body.

11. A high pressure valve comprising:
    a valve body having a sidewall defining a cylindrical bore extending therethrough along a centerline and further defining a plug bore extending therethrough perpendicular to the centerline;
    a tapered seal insert disposed within the plug bore;
    a plug rotatably disposed within the tapered seal insert, the plug having an upper stem extending upward relative to the centerline and a lower stem extending downward relative to the centerline;
    a first cap annularly disposed around the upper stem between the plug and the valve body, the first cap having a first interior surface disposed adjacent an exterior surface of the upper stem and a first exterior surface disposed adjacent an interior surface of the plug bore of the valve body;

a first retaining nut installed in an upper portion of the plug bore and bearing against the first cap to retain the first cap in the plug bore;

a second cap annularly disposed around the lower stem of the plug between the plug and the valve body, the second cap having a second interior surface disposed adjacent an exterior surface of the lower stem and a second exterior surface disposed adjacent the interior surface of the plug bore of the valve body;

a second retaining nut installed in a lower portion of the plug bore and having an upper surface and bearing against the second cap to retain the second cap in the plug bore;

wherein, the first and second caps are prevented from rotating relative to the valve body when the first and second retaining nuts are installed; and wherein, when the plug is rotated relative to the valve body, the exterior surfaces of the stems move relative to the adjacent interior surfaces of the respective caps, but the exterior surfaces of the respective caps remain stationary relative to the adjacent interior surfaces of the valve body.

12. The high pressure valve of claim 11, further comprising:

an upper stem seal disposed between the first interior surface of the first cap and the exterior surface of the upper stem;

an upper cap seal disposed between the first exterior surface of the first cap and the interior surface of the valve body;

a lower stem seal disposed between the second interior surface of the second cap and the exterior surface of the lower stem; and a lower cap seal disposed between the second exterior surface of the second cap and the interior surface of the valve body.

13. The high pressure valve of claim 12, wherein:

the first retaining nut further includes first exterior threads;

the upper portion of the plug bore includes first interior threads; and the first retaining nut is removably installed in the upper portion of the plug bore by engagement of the first exterior threads with the first interior threads.

14. The high pressure valve of claim 12, wherein:

the second retaining nut further includes second exterior threads;

the lower portion of the plug bore includes second interior threads; and the second retaining nut is removably installed in the lower portion of the plug bore by engagement of the second exterior threads with the second interior threads.

15. The high pressure valve of claim 14, wherein the second cap further includes an upward facing cap surface opposite the downward facing exterior shoulder, and the upward facing cap surface abuts a lower facing surface of the tapered seal insert.

16. The high pressure valve of claim 15, further comprising an interior lip formed on an interior surface of the tapered insert, the interior lip configured to engage a shoulder formed on the plug; and wherein moving the tapered seal insert upward in the plug bore of the valve body also moves the plug upward in the valve body.

* * * * *